United States Patent
Wang et al.

(10) Patent No.: US 9,411,291 B2
(45) Date of Patent: Aug. 9, 2016

(54) MULTIFUNCTIONAL MAGNETIC READING DEVICE AND CONTROL METHOD THEREOF AS WELL AS PRINTER

(71) Applicant: SHANDONG NEW BEIYANG INFORMATION TECHNOLOGY CO., LTD, Shandong (CN)

(72) Inventors: Chuntao Wang, Shandong (CN); Zhuanlong Yu, Shandong (CN); Zhenhu Xie, Shandong (CN); Lei Zheng, Shandong (CN)

(73) Assignee: Shandong New Beiyang Information Technology Co., Ltd., Weihai (CN)

( * ) Notice: Subject to any disclaimer, the term of this patent is extended or adjusted under 35 U.S.C. 154(b) by 0 days.

(21) Appl. No.: 14/404,907

(22) PCT Filed: Jun. 19, 2013

(86) PCT No.: PCT/CN2013/077463
§ 371 (c)(1),
(2) Date: Sep. 3, 2015

(87) PCT Pub. No.: WO2014/000590
PCT Pub. Date: Jan. 3, 2014

(65) Prior Publication Data
US 2015/0370210 A1      Dec. 24, 2015

(30) Foreign Application Priority Data

Jun. 25, 2012   (CN) .......................... 2012 1 0211199

(51) Int. Cl.
| | | |
|---|---|---|
| *G06K 9/00* | (2006.01) | |
| *G03G 15/00* | (2006.01) | |
| *G11B 5/008* | (2006.01) | |
| *G06K 9/18* | (2006.01) | |
| *G06K 7/08* | (2006.01) | |
| *G06K 19/06* | (2006.01) | |

(52) U.S. Cl.
CPC ................ *G03G 15/60* (2013.01); *G06K 9/186* (2013.01); *G11B 5/00808* (2013.01); *G03G 2215/00312* (2013.01)

(58) Field of Classification Search
CPC ............. G06K 9/00; G11B 5/00; G03G 15/00
USPC ................... 382/137, 139, 320; 235/449, 493
See application file for complete search history.

(56) References Cited

U.S. PATENT DOCUMENTS

| | | | |
|---|---|---|---|
| 8,382,102 B2 | 2/2013 | Imae | |
| 8,457,383 B2 * | 6/2013 | Imae | ........................ G06K 9/18 358/301 |
| 8,508,753 B2 | 8/2013 | Asada | |
| 8,854,640 B2 * | 10/2014 | Nakamaki | ............. G06F 3/1209 358/1.13 |

FOREIGN PATENT DOCUMENTS

| | | |
|---|---|---|
| CN | 101 987 535 A | 3/2011 |
| CN | 102 131 031 A | 7/2011 |
| CN | 202 058 444 U | 11/2011 |

OTHER PUBLICATIONS

International Search Report for Application No. PCT/CN2013/077463 dated Aug. 22, 2013.

* cited by examiner

*Primary Examiner* — Abolfazl Tabatabai
(74) *Attorney, Agent, or Firm* — Jenkins, Wilson, Taylor & Hunt, P.A.

(57) ABSTRACT

Disclosed are a multifunction magnetic reading device and a control method thereof as well as a printer. The multifunction magnetic reading device comprises a magnetic head component, a driving mechanism and a controller. The magnetic head component comprises a first magnetic head and an electromagnet. The first magnetic head comprises a first sub-head and a second sub-head. The electromagnet is configured to magnetize the MICR character. The driving mechanism is configured to drive the magnetic head component to reciprocate horizontally along a medium path in the medium path. According to the disclosure, a check and passbook processing device is also capable of reading a check inserted horizontally, and a user does not need to perform complex operations, which makes the multifunction magnetic reading device to be used conveniently.

17 Claims, 8 Drawing Sheets

MULTIFUNCTIONAL MAGNETIC READING DEVICE AND CONTROL METHOD THEREOF AS WELL AS PRINTER

The application claims the priority of Chinese patent application 201210211199.3, entitled "thermal printer and control method of the thermal printer" filed to the State Intellectual Property Office of the People's Republic of China on Jun. 25, 2012, the entire contents of which are incorporated herein by reference.

TECHNICAL FIELD OF THE DISCLOSURE

The disclosure relates to a multifunction magnetic reading device and a control method thereof as well as a printer.

BACKGROUND OF THE DISCLOSURE

In an existing bank system, a large number of magnetic mediums (medium for short) need to be processed, e.g. passbooks, checks and so on. When a passbook is processed, magnetic coded data in a magnetic stripe of the passbook needs to be read first, e.g. personal account information etc. Subsequently, the read personal account information is processed according to a service type transacted by a client, e.g. processing including depositing or withdrawals etc. according to the amount of a personal account. When a check is processed, a Magnetic Ink Character Recognition (MICR) character on the check needs to be magnetized first, and the magnetized MICR character is then read to verify the authenticity of the check, wherein the MICR character includes such information as a check number, a client account and a serial number etc. Since magnetic coded data of a magnetic stripe of a passbook and a MICR character of a check are different in coding, magnetic signal amplitude and magnetic recording density etc., passbooks and checks are generally processed by different magnetic reading devices in the prior art. Such a method not only causes operational inconvenience for bank staff to process services, but also increases the device costs of banks.

To solve the problem above, a check and passbook processing device is provided by a related technology. The processing device includes a movable magnetic head component and a fixed magnetic head component, wherein the moveable magnetic head component is moveably connected with a frame of the processing device and includes a carriage and a first magnetic head fixedly connected with the carriage. The carriage may be driven by a driving mechanism to drive the first magnetic head to reciprocate horizontally along a medium conveying path. The first magnetic head can read magnetic coded data in a magnetic stripe of a passbook when moving. The fixed magnetic component is fixedly connected with the frame of the processing device, and located at a horizontal side of the medium conveying path, and includes a permanent magnet and a second magnetic head, wherein along the medium conveying direction, the permanent magnet is located upstream via the second magnetic head. When a check moves longitudinally along the medium conveying path, the permanent magnet magnetizes a MICR character on the check and the second magnetic head reads the magnetized MICR character.

With regard to the check and passbook processing device, in order to ensure that a medium can be read, a passbook can only be inserted horizontally, and a check longitudinally. The existing check and passbook processing device cannot process a horizontally-inserted check, which further causes the problem of operation inconvenience of the check and passbook processing device.

SUMMARY OF THE DISCLOSURE

The main purpose of the disclosure is to provide a multifunction magnetic reading device and a control method thereof as well as a printer to solve the problem that an existing check and passbook processing device is incapable of reading a check inserted horizontally.

To realize the purpose above, a multifunction magnetic reading device is provided according to one aspect of the disclosure. The multifunction magnetic reading device includes a magnetic head component, a driving mechanism and a controller, wherein the magnetic head component includes a first magnetic head and an electromagnet, and the first magnetic head includes a first sub-head and a second sub-head; the first sub-head is configured to read magnetic coded data recorded in a medium magnetic stripe; the second sub-head is configured to read a MICR character on a medium; the electromagnet is configured to magnetize the MICR character; the driving mechanism is configured to drive the magnetic head component to reciprocate horizontally along a medium path in the medium path; and the controller is configured to, when a medium is medium with a magnetic stripe and the medium horizontally inserted, control the first sub-head to move along the direction of the magnetic stripe on the medium to read magnetic coded data recorded in the magnetic stripe, and when determining that the medium is a medium with a MICR character and horizontally inserted, control the electromagnet to be powered on first to magnetize the MICR character on the medium, then control the second sub-head to read the MICR character on the medium, wherein the horizontal insertion means that the extension direction of the magnetic stripe or the MICR character of the medium is vertical to the moving direction of the medium.

Further, the controller is further configured to, when a medium is medium with a magnetic stripe and the medium longitudinally inserted, control the first sub-head to read magnetic coded data recorded in the medium magnetic stripe during convey of the medium, wherein the longitudinal insertion means that the extension direction of the magnetic stripe of the medium is parallel to the medium conveying direction.

Further, the controller is further configured to, when a medium is medium with a MICR character and the medium longitudinally inserted, during the moving process of the medium along a first direction, control the electromagnet to be powered on first to magnetize the MICR character on the medium, and after the magnetization, during the moving process of the medium along a second direction, control the second sub-head to read the MICR character on the medium, wherein the longitudinal insertion means that the extension direction of the MICR character of the medium is parallel to the medium conveying direction; the first direction is the insertion direction of the medium and the second direction is the direction opposite to the first direction.

Further, the multifunction magnetic reading device further includes: a second magnetic head provided downstream the electromagnet along the insertion direction of the medium; the controller is further configured to, when a medium is medium with a MICR character and the medium longitudinally inserted, during the moving process of the medium along a first direction, control the electromagnet to be powered on first to magnetize the MICR character on the medium, then control the second magnetic head to read the MICR character on the medium, wherein the first direction is the insertion direction of the medium.

Further, the controller is further configured to: determine the type of the medium; and/or determine whether the medium is inserted horizontally or longitudinally.

Further, the multifunction magnetic reading device further includes a communication interface configured to receive a medium type instruction from an external control device; the controller is further configured to determine, according to the medium type instruction received by the communication interface, the type of the medium.

Further, the multifunction magnetic reading device further includes: a first sensor group, including at least two sensors configured to determine whether there is a horizontally-inserted medium.

Further, the multifunction magnetic reading device further includes: a second sensor group, including at least one sensor configured to detect whether there is a longitudinally-inserted medium in the medium path.

Further, the multifunction magnetic reading device further includes: a medium conveying mechanism; the medium conveying mechanism includes a medium conveying motor and a conveying roller component; the medium conveying motor is configured to drive the conveying roller component to rotate; the conveying roller component is configured to convey the medium to move longitudinally along the medium path; the driving mechanism includes a carriage driving motor configured to drive the magnetic head component to reciprocate horizontally along the medium path in the medium path.

To realize the purpose above, a control method of a multifunction magnetic reading device is provided by another aspect of the disclosure. The control method includes: when a medium is medium with a magnetic stripe and the medium horizontally inserted, driving a magnetic head component to move horizontally along a medium path in the medium path, and controlling the first magnetic head in the magnetic head component to read magnetic coded data recorded in the magnetic stripe; and when a medium is medium with a MICR character and the medium horizontally inserted, driving the magnetic head component to move horizontally along the medium path in the medium path, and controlling an electromagnet of the magnetic head component to be powered on first to magnetize the MICR character on the medium, then control the first magnetic head in the magnetic head component to read the MICR character on the medium, wherein the first magnetic head includes a first sub-head and a second sub-head; the first sub-head is configured to read the magnetic coded data recorded in the medium magnetic stripe; the second sub-head is configured to read the MICR character on the medium.

Further, the method further includes: determining whether the medium is inserted horizontally or longitudinally; when a medium is medium with a MICR character and the medium longitudinally inserted, the MICR character on the medium is read by the following methods:

Method 1: during a process of controlling the medium to move along a first direction, controlling the electromagnet in the magnetic head component to be powered on to magnetize the MICR character on the medium; and after the magnetization, control ling the medium to move along a second direction, and controlling the second sub-head to read the MICR character on the medium;

or

Method 2: during a process of controlling the medium to move along a first direction, controlling the electromagnet in the magnetic head component to be powered on to magnetize the MICR character on the medium; and after the magnetization, continuing to control the medium to move along the first direction, and controlling the second magnetic head to read the MICR character on the medium, wherein in the insertion direction of the medium, the second magnetic head is provided downstream the electromagnet, wherein the first direction is the insertion direction of the medium and the second direction is the direction opposite to the first direction.

To realize the purpose above, a printer is provided according to a third aspect of the disclosure. The printer includes any multifunction magnetic reading device provided by the disclosure.

With regard to the multifunction magnetic reading device above, since the magnetic head component including the first magnetic head and the electromagnet, and the driving mechanism which drives the magnetic head component to reciprocate horizontally along a medium path in the medium path, no matter a medium provided with a magnetic stripe or a medium provided with a MICR character, magnetic information on a horizontally-inserted medium can be read through the driving of the magnetic head component, thus solving the problem that an prior check and passbook processing device is incapable of reading a check inserted horizontally, and a user does not need to perform complex operations, so that the multifunction magnetic reading device can be used conveniently.

BRIEF DESCRIPTION OF THE DRAWINGS

The accompanying drawings, which form one part of the application, are used for further understanding the disclosure. The exemplary embodiments of the disclosure and the illustrations thereof are used for explaining the disclosure, instead of constituting an improper limitation to the disclosure. In the accompanying drawings.

DETAILED DESCRIPTION OF THE EMBODIMENTS

It should be noted that, if there is no conflict, the embodiments in the application and the characteristics in the embodiments can be combined with each other. The disclosure will be described in details below with reference to the accompanying drawings and in combination with the embodiments.

Figure 1A:
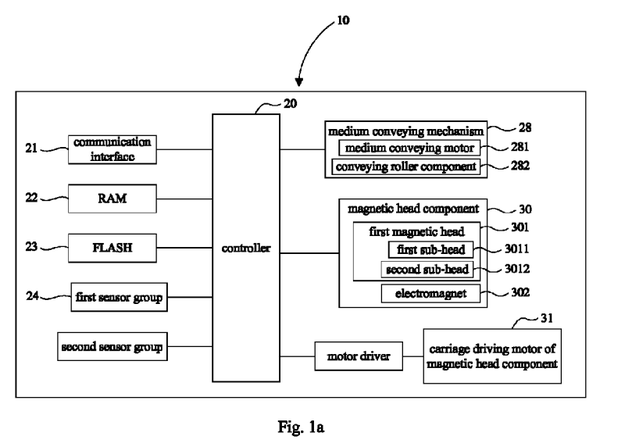
FIG. 1a is a schematic diagram illustrating module composition of a multifunction magnetic reading device according to the first embodiment of the disclosure.

FIG. 1a is a schematic diagram illustrating module composition of a multifunction magnetic reading device according to the first embodiment of the disclosure. As shown in the figure, the multifunction magnetic reading device 10 includes: a controller 20, a communication interface 21, a RAM (Random Access Memory) 22, a FLASH 23, a first sensor group 24, a second sensor, a medium conveying 28, a magnetic head component 30, a carriage driving motor 31 of the magnetic head component, wherein the controller 20 controls each module to work, e.g. controlling the communication interface 21 to receive various instructions sent by external control devices (e.g. computers, not shown in the figure), controlling the magnetic head component 30 to read magnetic information on a medium etc. The magnetic information may be magnetic coded data recorded in a magnetic stripe, or may be a MICR character. The communication interface 21 receives various instructions sent by external control devices, and stores various received instructions in the RAM 22 temporarily, wherein various instructions include medium type instructions and magnetic reading instructions. A medium type instruction is used for indicating whether a medium inserted into the device is a medium provided with a magnetic stripe (e.g. a magnetic card, a passbook etc.; to facilitate description, a medium printed with a magnetic stripe will be represented by a passbook hereinafter) or a medium printed with a MICR character (to facilitate description, a medium printed with a MICR character will be represented by a check hereinafter). The communication interface 21 is further configured to send reading magnetic information detection data to an external control device, wherein the magnetic information detection data includes magnetic stripe information detection data obtained by reading a magnetic stripe and MICR character detection data obtained by reading a MICR character. The magnetic reading instruction represents to read magnetic information on a medium. When an inserted medium is a passbook, the controller controls the magnetic head to read magnetic coded data recorded in a magnetic stripe on the passbook. When an inserted medium is a check, the controller controls the magnetic head to read a MICR character printed on the check. The RAM 22 is configured to store various received instructions and magnetic information detection data read by the magnetic head. The FLASH 23 is configured to store a control program of the multifunction magnetic reading device.

The magnetic head component 30 includes the first magnetic head 301 and an electromagnet 302, wherein the first magnetic head 301 is configured to read magnetic information on a medium. The electromagnet 302 is configured to magnetize a MICR character on a check to ensure the amplitude of a MICR character detection signal. The first magnetic head 301 includes a first sub-head 3011 and a second sub-head 3012, wherein the first sub-head 3011 is configured to read magnetic coded data recorded in a magnetic stripe of a passbook to obtain magnetic stripe information detection data. The second sub-head 3012 is configured to read a MICR character on a magnetic ink printing area of a check to obtain MICR character detection data. The carriage driving motor 31 of the magnetic head component is configured to drive the magnetic head component 30 to reciprocate horizontally (the horizontal direction means a direction perpendicular to the medium conveying direction) along a medium path in the medium path. In the embodiment of the disclosure, since the electromagnet 302 magnetizes the MICR character, the electromagnet is controlled to be powered on to be magnetic only when a medium provided with a MICR character needs to be magnetized. When it is unnecessary to magnetize a medium provided with a MICR character, e.g. when a medium provided with a magnetic stripe is inserted, the electromagnet is controlled under a power-off state so that the electromagnet is not magnetic, thus preventing magnetic coded data in the magnetic stripe from being influenced by an magnetic field generated by the electromagnet.

The medium conveying mechanism 28 includes a medium conveying motor 281 and a conveying roller component 282, wherein the medium conveying motor 281 is configured to drive the conveying roller component 282 to rotate. The conveying roller component 282 is configured to drive a medium to move longitudinally along the medium path.

The first sensor group 24 includes at least two sensors configured to determine whether there is a horizontally-inserted medium, and the horizontally-inserted medium is skew, wherein the horizontal insertion means that the extension direction of a magnetic stripe or a MICR character of the magnetic stripe is perpendicular to the moving direction of the medium. The controller 20 determines, according to an output signal of at least two sensors in the first sensor group 24, whether the inserted medium is skew. Preferably, multiple sensors of the first sensor group 24 are aligned horizontally in a straight line along the medium path. Preferably, each sensor is a photoelectric sensor and includes a light emitter and a light receiver. The light emitter emits lights to the medium path and the light receiver receives lights penetrating through the medium or lights reflected by the medium. Whether the medium is inserted into the medium path is determined according to the strength of the received lights. The second sensor group includes at least one sensor configured to detect whether there is a longitudinally-inserted medium in the medium path, wherein the longitudinal insertion means that the extension direction of a magnetic stripe or a MICR character of the medium is parallel to the medium conveying direction. The controller 20 determines, according to an output signal of the second sensor, whether the medium is inserted into the medium path longitudinally.

Figure 1B:
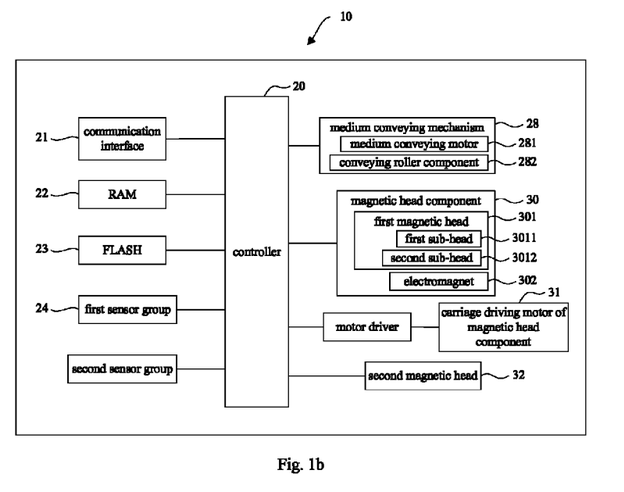
FIG. 1b is a schematic diagram illustrating module composition of a multifunction magnetic reading device according to the second embodiment of the disclosure.

FIG. 1b is a schematic diagram illustrating module composition of a multifunction magnetic reading device according to the second embodiment of the disclosure. The multifunction magnetic reading device provided by the embodiment is different from that provided by the first embodiment in FIG. 1a that the multifunction magnetic reading device further includes a second magnetic head 32. The second magnetic head 32 is fixedly installed in the medium path, located downstream the magnetic head component 30 along the medium conveying direction and configured to read a MICR character of a magnetic ink printing area of a longitudinally-inserted check.

Figure 2:
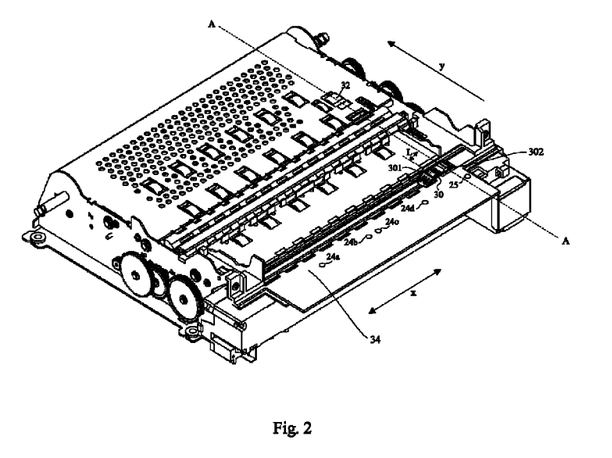
FIG. 2 is a schematic diagram illustrating the main structure of a multifunction magnetic reading device according to an embodiment of the disclosure.

FIG. 2 is a schematic diagram illustrating the main structure of a multifunction magnetic reading device according to an embodiment of the disclosure. An upper path frame of the multifunction magnetic reading device is omitted in the figure. In the multifunction magnetic reading device 10, a medium inlet 34, multiple sensors of a first sensor group 24 and a sensor 25, a magnetic head component 30 and the second magnetic head 32 etc. are aligned in turn along a medium conveying direction (the y direction in the figure). The first sensor group 24 includes sensor 24a, sensor 24b, sensor 24c and sensor 24d distributed horizontally (the x direction in the figure) in turn along the medium path. The second sensor group only includes one sensor, e.g. sensor 25. The sensor 25 is located at the left edge of the medium path. In other embodiments of the disclosure, the second sensor group may include two sensors aligned in a row along the medium conveying direction. Each sensor is equally distanced from the left side of the medium path. At the moment, not only whether a medium is inserted longitudinally, but also whether the longitudinally-inserted is skew can be determined by output signals of the two sensors.

The magnetic head component 30 may reciprocate horizontally along the medium path. When the multifunction magnetic reading device is idle, the magnetic head component 30 is located at the Home Position (HP). When the magnetic head component 30 is located at the HP position, the connection line A-A between an electromagnet 302 in the magnetic head component 30 and the second magnetic head 32 is parallel to the reference plane of the medium path. The distance between a first magnetic head 301 in the magnetic head component 30 and the electromagnet 302 is L. When a check is longitudinally inserted into the medium path and aligned with the left edge of the medium path, the positions of the electromagnet 302 and the second magnetic head 32 correspond to the position of a MICR character of a check magnetic ink printing area. When a passbook is longitudinally inserted into the medium path and aligned with the left edge of the medium path, the magnetic head component 30 move rightwards with the distance L from the HP position so that the position of the first magnetic head 301 corresponds to the position of a magnetic stripe area on the longitudinally-inserted passbook.

Figure 3:
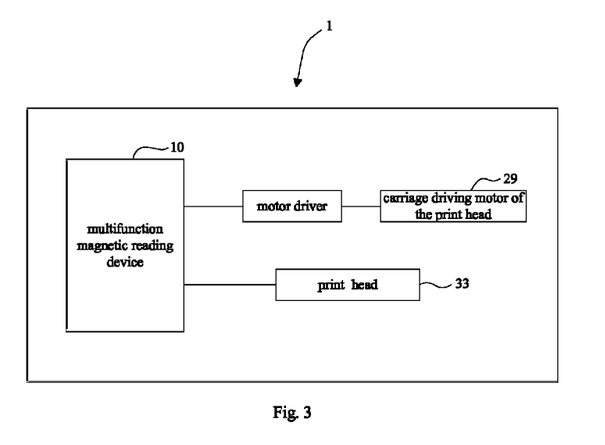
FIG. 3 is a schematic diagram illustrating module composition of a printer according to an embodiment of the disclosure.

FIG. 3 is a schematic diagram illustrating module composition of a printer according to an embodiment of the disclosure. As shown in the figure, the printer 1 includes a multifunction magnetic reading device 10, a print head 33 and a carriage driving motor 29 of the print head, wherein the multifunction magnetic reading device 10 is a multifunction magnetic reading device 10 provided by the disclosure. The print head 33 is fixedly connected with a carriage (not shown in the figure) of the print head and configured to print data on a medium, e.g. printing an amount of money and a date on a passbook, and endorsement information on a check etc. Preferably, the print head 33 is a stylus print head that strikes ink on an ink stripe to a medium through a printing needle to generate a character or an image on the medium. The print head 33 may be also as an ink jet print head that forms a character or an image on a medium through jetting ink droplets. The carriage driving motor 29 of the print head is configured to drive the print head 33 installed on the carriage of the print head to reciprocate horizontally along a medium path. The printer provided with the multifunction magnetic reading device 10 can read magnetic information on a medium, and can further print data on the medium, e.g. printing related operation details on an inside page of a passbook after reading magnetic coded data recorded in a magnetic stripe of the passbook, or printing endorsement information at the back of a check after reading a MICR character on the check etc.

An embodiment of the disclosure further provides a control method of a multifunction magnetic reading device. It should be noted that the method of the multifunction magnetic reading device in the disclosure may be executed by the multifunction magnetic reading device of the disclosure, but is not limited thereto, and the multifunction magnetic reading device of the disclosure may be used for executing the control method of the multifunction magnetic reading device of the disclosure.

In the control method of the multifunction magnetic reading device of the embodiment of the disclosure:

When a medium is a medium provided with a magnetic stripe and the medium is inserted horizontally, a magnetic head component 30 is driven to move horizontally along a medium path in the medium path, and a first magnetic head 301 in the magnetic head component 30 is controlled to read magnetic coded data recorded in the magnetic stripe of the medium.

When a medium is medium with a MICR character and the medium horizontally inserted, the magnetic head component 30 is driven to move horizontally along the medium path in the medium path, and an electromagnet 302 is controlled first to magnetize the MICR character on the medium, then the first magnetic head 301 in the magnetic head component 30 is controlled to read the MICR character of a magnetic ink printing area of medium, wherein the first magnetic head 301 includes a first sub-head 3011 and a second sub-head 3012. The first sub-head 3011 is configured to read the magnetic coded data recorded in the magnetic stripe of the medium. The second sub-head 3012 is configured to read the MICR character of the magnetic ink printing area of the medium.

It should be noted that the multifunction magnetic reading device may acquire the type of the medium or the insertion direction of the medium through the following methods, but is not limited thereto:

Method 1: acquire the type or the insertion direction of the medium directly by information inputted by a user;

Method 2: provide the multifunction magnetic reading device with different working modes; under different working modes, the type or insertion direction of the medium is fixed by default;

Method 3: determine the type of the medium according to an instruction inputted by a user;

Method 4: determine the insertion direction of the medium according to a signal of a sensor in a medium path.

A preferred embodiment of a control method of a multifunction magnetic reading device of the disclosure will be introduced as follows.

Figure 4A:
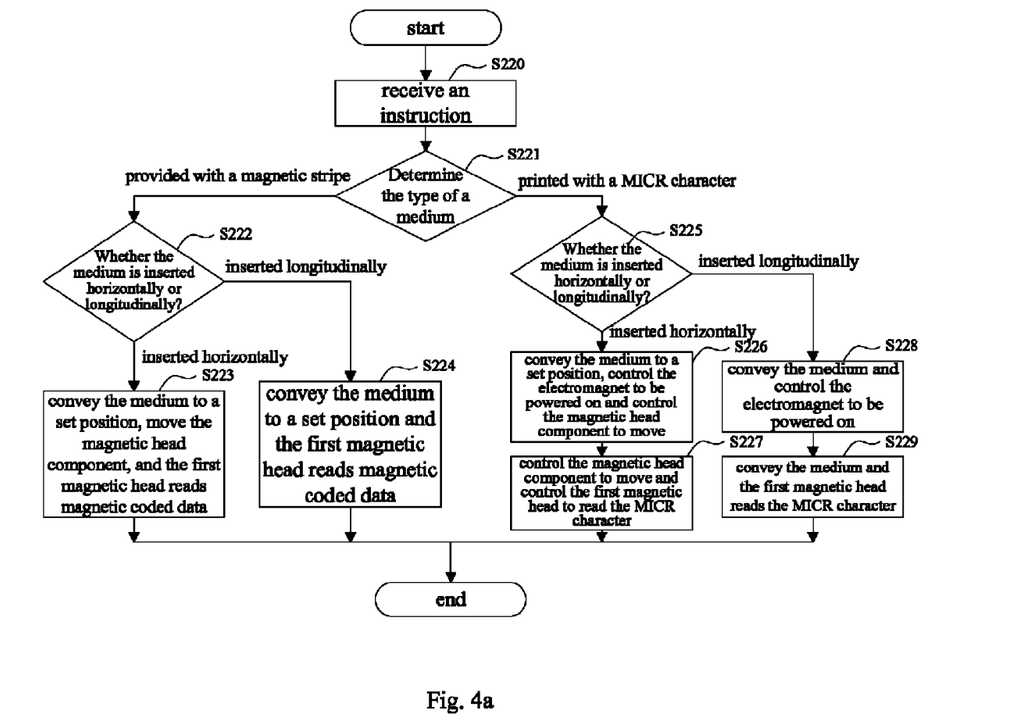
FIG. 4a is a flowchart of a control method of a multifunction magnetic reading device according to the first embodiment of the disclosure.
Figure 5:
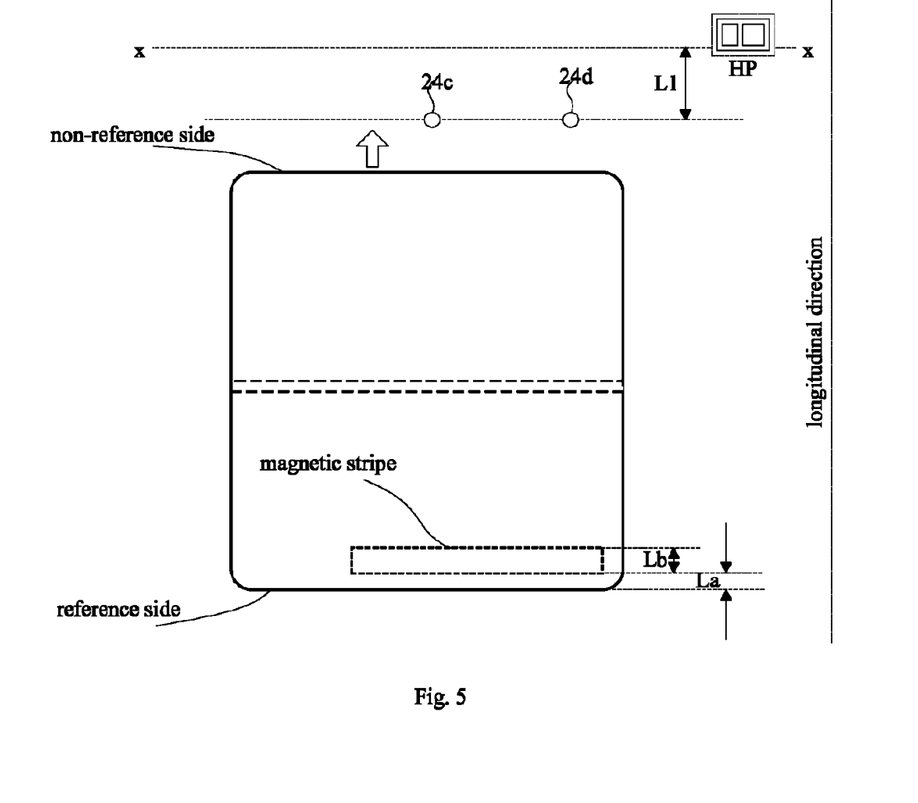
FIG. 5 is a schematic diagram illustrating the position of a horizontally-inserted passbook moving in a medium path according to an embodiment of the disclosure.
Figure 6:
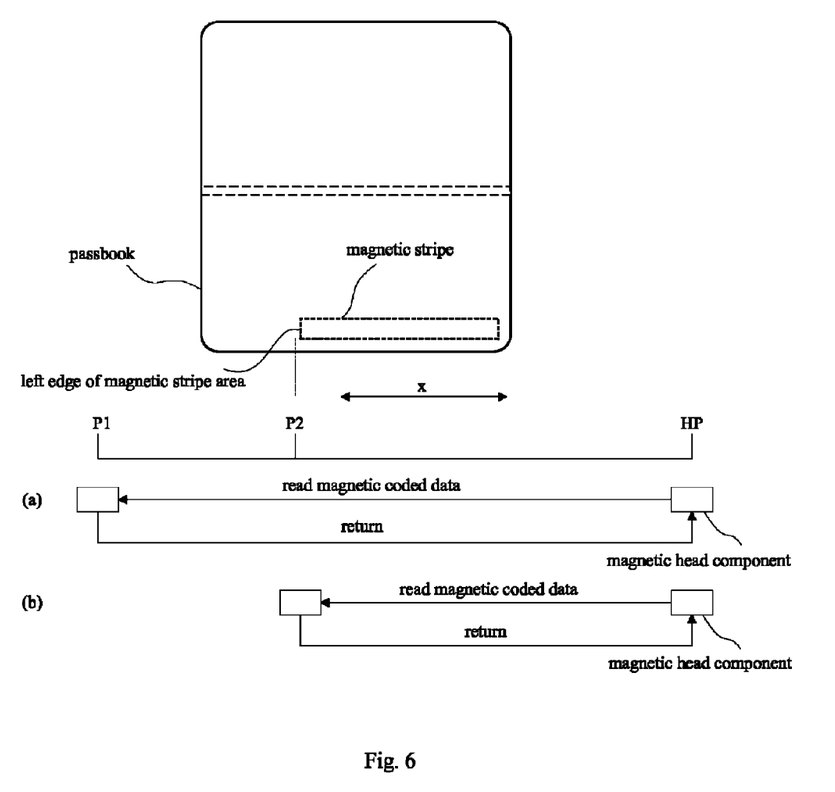
FIG. 6 is a schematic diagram illustrating the position of a magnetic head component horizontally reading information of a magnetic stripe on a medium during a moving process according to an embodiment of the disclosure.
Figure 7:
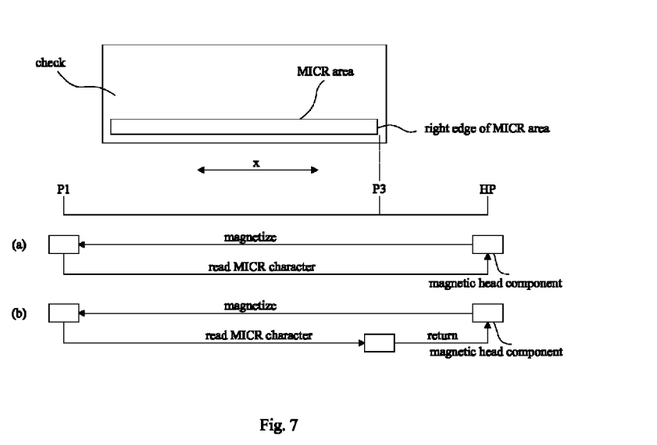
FIG. 7 is a schematic diagram illustrating the position of a magnetic head component horizontally reading a MICR character on a medium during a moving process according to an embodiment of the disclosure.
Figure 8:
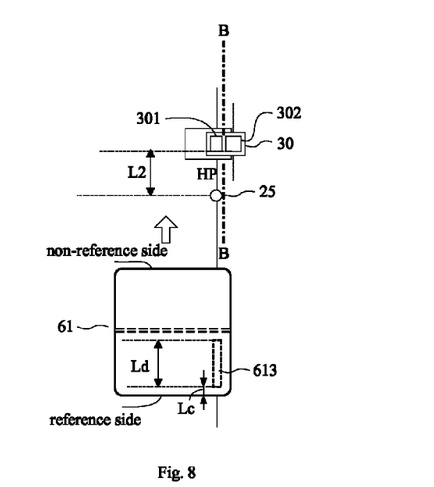
FIG. 8 is a schematic diagram illustrating the position of a longitudinally-inserted passbook moving in a medium path according to an embodiment of the disclosure.

FIG. 4a is a flowchart of a control method of a multifunction magnetic reading device according to the first embodiment of the disclosure and the specific processing procedure is as follows:

Step 220: receive instructions;

the multifunction magnetic reading device 10 receives various instructions from external control devices through a communication interface 21; a controller 20 stores the received instructions in an RAM 22 temporarily; the received instructions include medium type instructions and magnetic reading instructions, wherein a medium type instruction is used for indicating whether an inserted medium is a passbook or a check, and a magnetic reading instruction is used for reading magnetic information on the medium; when an inserted medium is a passbook, the controller 20 controls a first sub-head 3011 to read magnetic coded data recorded in a magnetic stripe of the passbook; when an inserted medium is a check, the controller 20 controls a second sub-head 3012 to read a MICR character of a magnetic ink printing area of the check;

Step S221: determine the type of an inserted medium;

the controller 20 determines, according to a medium type instruction temporarily stored in the RAM 22, the type of an inserted medium; when the inserted medium is a medium printed with a MICR character, Step 225 is performed; when the inserted medium is a medium provided with a magnetic stripe, Step 222 is performed, e.g. the medium type instruction is an instruction represented by the hexadecimal system in a format of 10 06 n, where n represents the medium type; when n=0, it means that the inserted medium is a medium provided with a magnetic stripe, i.e. the inserted medium is a passbook; when n=1, it means that the inserted medium is a medium provided with a MICR character, i.e. the medium is a check;

Step 222: determine whether the medium is inserted horizontally or longitudinally;

the controller 20 determines, according to an output signal of a first sensor group 24, whether there is a horizontally-inserted medium in a medium path, and determines, according to an output signal of a second sensor group, whether there is a longitudinally-inserted medium in the medium path, e.g. sensors in the first sensor group 24 and the second sensor group are photoelectric sensors including light emitters and light receivers; the light emitters and the light receivers are provided oppositely; the light receiver can receive lights sent by the light emitters; when there is no medium inserted, lights emitted by the light emitters irradiate on the light receivers directly without blockage, then the light receivers receive strong lights, and output a first detection signal, e.g. a high electrical level; when a medium is inserted to the medium path, the medium shields the light receivers; blocked by the medium, the light receivers fail to receive the lights or extremely weak lights, and output a second detection signal, e.g. a low electrical level; therefore, the controller determines, according to a detection signal outputted by the light receivers, whether there is a medium inserted into the medium path; when at least two sensors of the first sensor group 24 output signals indicating that there is an inserted medium, it indicates that the medium is inserted horizontally and that the medium is not inserted obliquely, then Step 223 is performed; when a sensor 25 in the second sensor group detects a medium, it indicates that the medium is inserted longitudinally along the edge of the medium path (for a magnetic medium reading device, when inserting a medium horizontally, a user will insert the medium from a middle position by default instead of inserting the medium from one side), then Step 224 is performed; in other embodiment of the disclosure, if the second sensor group includes two sensors, when these two sensors output signals indicating that there is an inserted medium, it indicates that the medium is inserted longitudinally and that the medium is not inserted obliquely;

Step 223: convey the medium to a set position, move a magnetic head component, and a first magnetic head reads magnetic coded data;

when the medium is a medium (e.g. a passbook) inserted horizontally and provided with a magnetic stripe, according to the distance from the magnetic stripe to the reference edge of the passbook and the distance from the first sensor group 24 to the magnetic head component 30 in the longitudinal direction, the controller 20 controls a medium conveying mechanism 28 to drive the medium to move forward with a certain distance to a set position; at the set position, the magnetic stripe of the passbook corresponds to the first magnetic head 301 in the magnetic head component 30; as shown in FIG. 5, the set position is position x-x of the HP in the longitudinal direction; when a non-reference side of the passbook is inserted (a side not provided with a magnetic stripe) first, the first sensor group 24 continues to drive the passbook to move forward after detecting the non-reference side of the passbook (the output signal of the first sensor group 24 changes from indicating that there is no medium to indicating that there is a medium at the moment); when the reference side of the passbook is detected (the output signal of the first sensor group 24 changes from indicating that there is a medium to indicating that there is no medium at the moment), then the passbook is driven to move forward with a distance of (L1−La), and the passbook reaches the set position, wherein La is the distance from the lower edge of the magnetic stripe area to the reference side, L1 is the distance between a sensor in the first sensor group 24 to the magnetic head component 30 in the longitudinal direction; the dashed frame area in the figure is the magnetic stripe area, and the dashed lines indicate that the magnetic stripe is located at the back, i.e. the cover of the passbook faces downwards; of course, the reference side of the passbook may be also inserted first; when a sensor of the first sensor group 24 detects the reference side of the passbook, the medium is driven to move forward with a distance of (L1+La+Lb), and then the passbook reaches the set position, wherein Lb is the width of the magnetic stripe area; after the medium reaches the set position, a carriage driving motor 31 of the magnetic head component drives the magnetic head component 30 to move from the HP position towards a direction close to the medium; the controller 20 controls the first sub-head 3011 in the magnetic head component 30 to read magnetic coded data on the magnetic stripe of the medium and output the magnetic stripe information detection data; as shown in (a) of FIG. 6, the magnetic head component 30 moves from the HP position along the HP->P1 direction; during the moving process, the first sub-head 3011 reads the magnetic coded data recorded in the magnetic stripe of the medium and outputs the magnetic stripe information detection data; when reaching the P1 position at the leftmost end, the first sub-head 3011 stops reading the magnetic coded data, then the magnetic head component moves along the P1->HP direction to return to the HP direction; preferably, as shown in (b) of FIG. 6, during the process in which the first sub-head 3011 reads the magnetic coded data on the medium, when a magnetic signal corresponding to the read magnetic coded data disappears, i.e. the magnetic head component has left the left edge of the magnetic area, the magnetic head component 30 stops moving immediately, e.g. stopping at the P2 position, then returns along the P2->HP direction to stop at the HP position;

Step 224: convey the medium to the set position and the first magnetic head reads the magnetic coded data;

according to the output signal of the second sensor group, the controller controls the medium conveying mechanism to convey the medium to the set position; at the set position, the first magnetic head is controlled to read the magnetic information; at the set position, the upper edge of the magnetic stripe area of the passbook right corresponds to the first magnetic head; as shown in FIG. 8, when the sensor 25 detects that the passbook is inserted longitudinally along the left side B-B of the medium path, if a non-reference side of the passbook is inserted (a side not provided with a magnetic stripe) first, the sensor 25 continues to drive the passbook to move forward after detecting the non-reference side of the passbook (the output signal of the sensor 25 changes from indicating that there is no medium to indicating that there is a medium at the moment); when the reference side of the passbook is detected (the output signal of the sensor 25 changes from indicating that there is a medium to indicating that there is no medium at the moment), the medium conveying mechanism 28 drives the passbook 61 to move backward longitudinally with a distance of (Lc+Ld−L2) so that the medium reaches the set position; at the moment, the upper edge of the magnetic stripe area of the passbook right corresponds to the first magnetic head, wherein Lc is the distance from the lower edge of the magnetic stripe area to the reference side, Ld is the length of the magnetic stripe, L2 is the distance from the sensor 25 to the magnetic head component 30 in the longitudinal direction; subsequently, the medium conveying mechanism conveys the medium to move; during the moving process of the medium, the controller 20 controls the first sub-head 3011 of the first magnetic head 301 in the magnetic head component 30 to read the magnetic coded data of the magnetic stripe and outputs the magnetic information detection data; after the medium is conveyed for a distance of Ld, the controller 20 controls the first sub-head 3011 of the first magnetic head 301 to stop reading the magnetic coded data; it should be noted that, when the longitudinal position of the first magnetic head 301 in the magnetic head component 30 does not correspond to the longitudinal position of the magnetic stripe 613 of the passbook, the position of the magnetic head component 30 is adjusted and the magnetic head component is moved with a certain distance so that the longitudinal positions of the two correspond to each other;

Step 225: determine whether the medium is inserted horizontally or longitudinally;

the controller 20 determines, according to the output signal of the first sensor group 24, whether there is a horizontally-inserted medium in the medium path, and determines, according to the output signal of the second sensor group, whether there is a longitudinally-inserted medium in the medium path; when at least two sensors of the first sensor group 24 detect that there is a medium inserted, it indicates that the medium is inserted horizontally and the medium is not inserted obliquely, then Step 226 is performed; when the sensor 25 of the second sensor group detects a medium, it indicates that the medium is inserted longitudinally along the edge of the medium path, then Step 228 is performed; in other embodiments of the disclosure, if the second sensor group includes two sensors, when these two sensor output signals indicating that there is a medium inserted, it means that the medium is inserted longitudinally and the medium is not inserted obliquely;

Step 226: convey the medium to the set position and control an electromagnet to be powered on and control the magnetic head component to move;

when the horizontally-inserted medium is a medium provided with a MICR character, e.g. a check, the controller 20 controls the medium conveying mechanism 28 to drive the check to move to the set position first; at the set position, a magnetic ink printing area of the check corresponds to the first magnetic head 301 in the magnetic head component and the electromagnet 302; subsequently, the controller 20 controls the electromagnet to be powered on, and controls the magnetic head component 30 to move horizontally along the medium path; when the electromagnet 302 is powered on, a magnetic field generated by the electromagnet 302 magnetizes the MICR character on the check; when the electromagnet 302 is powered off, the electromagnet does not generate a magnetic field and the electromagnet does not affect the MICR character on the check; as shown in (a) of FIG. 7, after the electromagnet 302 is powered on, the carriage driving motor 31 of the magnetic head component drives the magnetic head component 30 to move along the HP->P1 direction; during the moving process of the magnetic head component 30, the magnetic field generated by the electromagnet 302 magnetizes the MICR character on the check to ensure the signal amplitude when the MICR character is read; when the magnetic head component reaches the leftmost end P1, the electromagnet 302 is powered off, then the electromagnet 302 stops magnetizing the MICR character; it should be noted that, according to the distance of the magnetic ink printing area at the front edge or back edge of the check, the controller controls, according to an output signal of the first sensor group 24 to detect the front edge or back edge of the check, the medium conveying device to move forward or backward for a set distance so that the check moves to the set position;

Step 227: control the magnetic head component to move and control the first magnetic head to read the MICR character;

after the electromagnet 302 magnetizes the MICR character on the check, the controller 20 controls the magnetic head component to move horizontally along the medium path; during the moving process of the magnetic head component 30, the second sub-head 3012 of the first magnetic head 301 reads the MICR character on the check and outputs MICR character detection data; as shown in (a) of FIG. 7, during the moving process of the magnetic head component 30 from the leftmost end P1 towards the HP position, the second sub-head 3012 reads the MICR character printed on the check until the magnetic head component 30 reaches the HP position; preferably, as shown in (b) of FIG. 7, when a magnetic signal corresponding to the read MICR character is detected to disappear, the second sub-head 3012 stops reading the MICR character at position P3 outside the right edge of the MICR area to save the storage space of the RAM 22; after reading the MICR character, the magnetic head component 30 stops at the HP position;

Step 228: convey the medium and control the electromagnet to be powered on;

when the longitudinally-inserted medium is a medium printed with a MICR character, e.g. a check etc., the controller 20 controls the medium conveying mechanism 28 to move the check along the insertion direction, and controls the electromagnet 302 in the magnetic head component 30 located at the HP position to be powered on during the conveying process of the check to magnetize the MICR character on the check passing through the magnetic head component 30; when the check leaves the magnetic head component 30, the controller 20 controls the electromagnet 302 to be powered off;

Step 229: convey the medium and the first magnetic head reads the MICR character;

after magnetizing the MICR character of the longitudinally-inserted check, the controller 20 controls the medium conveying mechanism 28 to discharge the check from the medium path along the direction opposite to the insertion direction; during the discharging process of the check, the controller 20 further controls the second sub-head 3012 of the first magnetic head 301, read the MICR character on the check and output MICR character detection data and stop reading the MICR character until the check leaves the magnetic head component 30.

Figure 4B:
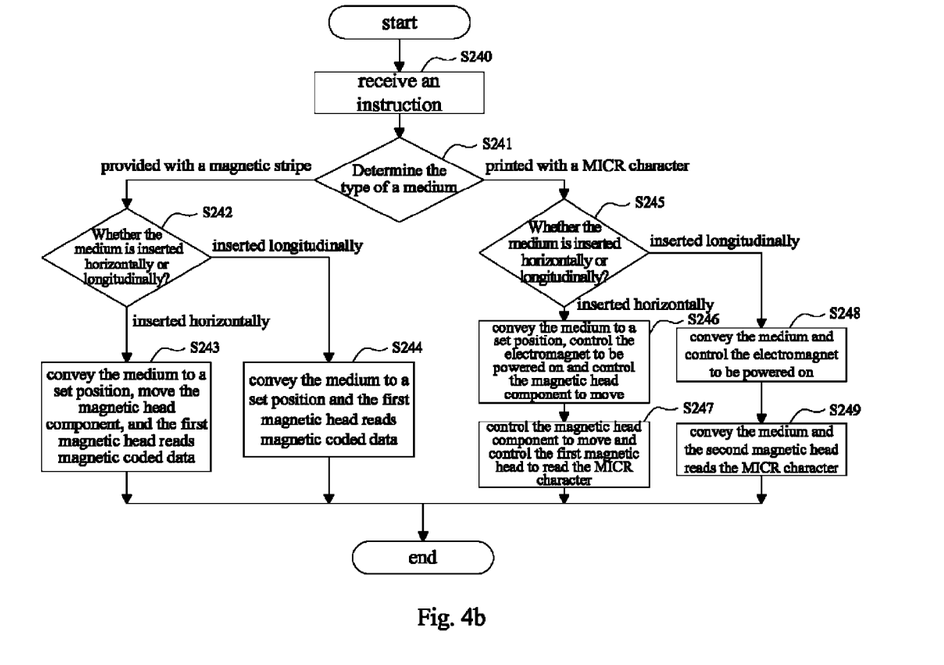
FIG. 4b is a flowchart of a control method of a multifunction magnetic reading device according to the second embodiment of the disclosure.
Figure 9:
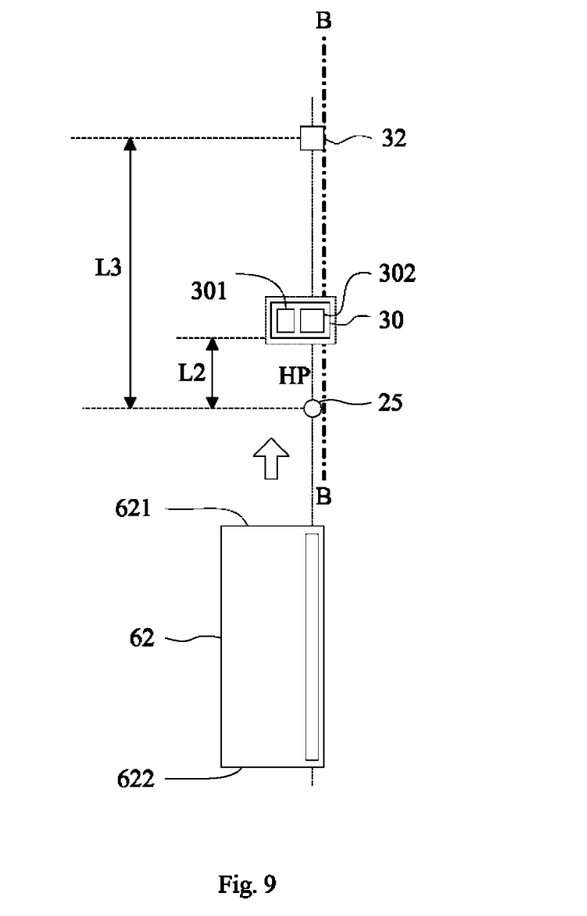
FIG. 9 is a schematic diagram illustrating the position of a longitudinally-inserted check moving in a medium path according to an embodiment of the disclosure.

FIG. 4b is a flowchart of a control method of a multifunction magnetic reading device according to the second embodiment of the disclosure and the specific processing procedure is as follows:

Step 240 to Step 248 are the same as Step 220 to Step 228;

Step 249: the second magnetic head reads the MICR character;

when the longitudinally-inserted medium is a medium printed with a MICR character, as shown in FIG. 9, the controller 20 controls the medium conveying mechanism 28 to move the check 62 forward long the left side B-B of the path; when detecting the front edge 621 of the check, the sensor 25 starts to calculate the moving distance of the check 62; when the moving distance of the check 62 is equal to the distance L3 between the sensor 25 and the second magnetic head 32, it is determined that the front edge 621 of the check reaches the second magnetic head 32; when the front edge 621 of the check reaches the second magnetic head 32, the controller 20 controls the second magnetic head 32 to start reading the MICR character of the magnetic ink printing area of the check and output the MICR character detection data until the back edge 622 of the check leaves the second magnetic head; when the back edge 622 of the check leaves the second magnetic head 32, reading of the MICR character stops.

Besides reading magnetic information of a medium, a printer 1 provided with a multifunction magnetic reading device 10 can further print the medium, wherein a method for controlling magnetic reading of the medium of the printer may apply any control method of a multifunction magnetic reading device above. When the printer receives, through a communication interface, a printing processing-related printing instruction and printing data sent by an external control device, data can be printed on the medium. The printer controls a printing mechanism according to the received printing instruction and printing data, wherein a carriage driving motor 29 of a print head drives the print head 33 to reciprocate horizontally to print the received printing data on the medium during the moving process, e.g. withdrawal records when the medium is a passbook and endorsement information when the medium is a check etc. During the printing process, a medium conveying mechanism 28 conveys the medium and generates lines of characters or images on the medium.

A multifunction magnetic reading device provided by an embodiment of the disclosure includes a first magnetic head capable of moving back and forth horizontally along a medium path and an electromagnet, wherein the first magnetic head includes a first sub-head configured to read magnetic coded data recorded on a magnetic stripe and a second sub-head configured to read a MICR character. The electromagnet is configured to magnetize a MICR character when a check is processed. According to the type of a medium, the first sub-head of the first magnetic head is controlled to work or the second sub-head of the first magnetic head and the electromagnet cooperates to work to process different types of mediums. According to the insertion direction of the medium, the first magnetic head and the electromagnet are controlled to move horizontally along the medium path while the medium stops at a set position, or the first magnetic head and the electromagnet are controlled to stop at a set position while the medium moves longitudinally along the medium path to process mediums inserted in different directions. Therefore, the multifunction magnetic reading device provided by the embodiment of the disclosure is simple in operation with strong applicability, which not only reduces the cost of purchasing device for a user, but also improves the working efficiency of service processing for the user. Further, the multifunction magnetic reading device further includes a fixed magnetic head located downstream the magnetic head component along the medium conveying direction. Magnetic information on a longitudinally-inserted medium is processed by the fixed magnetic head to improve the processing speed for the longitudinally-inserted medium.

The above are only preferred embodiments of the disclosure and should not be used for limiting the disclosure. The disclosure may have various modifications and changes for the technicians in the field. Any modifications, equivalent replacements, improvements and the like within the spirit and principle of the disclosure shall fall within the scope of protection of the disclosure.

What is claimed is:

1. A multifunction magnetic reading device, comprising:
   a magnetic head component, comprising a first magnetic head and an electromagnet, wherein the first magnetic head comprises a first sub-head and a second sub-head; the first sub-head is configured to read magnetic coded data recorded in a medium magnetic stripe; the second sub-head is configured to read a Magnetic Ink Character Recognition (MICR) character on a medium; the electromagnet is configured to magnetize the MICR character;
   a driving mechanism, configured to drive the magnetic head component to reciprocate horizontally along a medium path; and
   a controller, configured to, when a medium is medium with a magnetic stripe and the medium is horizontally inserted, control the first sub-head to move along the direction of the magnetic stripe to read magnetic coded data recorded in the magnetic stripe and, when determining that the medium is a medium with a MICR character and horizontally inserted, control the electromagnet to be powered on first to magnetize the MICR character on the medium, then control the second sub-head to read the MICR character on the medium, wherein the horizontal insertion direction is an extension direction of the magnetic stripe or the MICR character of the medium perpendicular to a medium conveying direction.

2. The multifunction magnetic reading device according to claim 1, wherein the controller is further configured to: when a medium is medium with a magnetic stripe and the medium is longitudinally inserted, control the first sub-head to read magnetic coded data recorded in the medium magnetic stripe during convey of the medium, wherein the longitudinal insertion direction is an extension direction of the magnetic stripe of the medium is parallel to the medium conveying direction.

3. The multifunction magnetic reading device according to claim 2, further comprising:
   a second sensor group, comprising at least one sensor configured to detect whether there is a longitudinally-inserted medium in the medium path.

4. The multifunction magnetic reading device according to claim 2, wherein the controller is further configured to:
   determine the type of the medium; and/or
   determine whether the medium is inserted horizontally or longitudinally.

5. The multifunction magnetic reading device according to claim 1, wherein the controller is further configured to: when a medium is medium with a MICR character and the medium is longitudinally inserted, during a moving process of the medium along a first direction, control the electromagnet to be powered on first to magnetize the MICR character on the medium and, after the magnetization, during the moving process of the medium along a second direction, control the second sub-head to read the MICR character on the medium, wherein the longitudinal insertion direction is an extension direction of the MICR character of the medium parallel to the medium conveying direction; the first direction is an insertion direction of the medium and the second direction is a direction opposite to the first direction.

6. The multifunction magnetic reading device according to claim 5, wherein the controller is further configured to:
   determine the type of the medium; and/or
   determine whether the medium is inserted horizontally or longitudinally.

7. The multifunction magnetic reading device according to claim 5, further comprising:
a second sensor group, comprising at least one sensor configured to detect whether there is a longitudinally-inserted medium in the medium path.

8. The multifunction magnetic reading device according to claim 1, wherein
the multifunction magnetic reading device further comprises: a second magnetic head provided downstream of the electromagnet along an insertion direction of the medium,
wherein the controller is further configured to, when a medium is medium with a MICR character and the medium is longitudinally inserted, during the moving process of the medium along a first direction, control the electromagnet to be powered on first to magnetize the MICR character on the medium, then control the second magnetic head to read the MICR character on the medium, wherein the first direction is the insertion direction of the medium.

9. The multifunction magnetic reading device according to claim 8, wherein the controller is further configured to:
determine the type of the medium; and/or
determine whether the medium is inserted horizontally or longitudinally.

10. The multifunction magnetic reading device according to claim 1, wherein the controller is further configured to:
determine the type of the medium; and/or
determine whether the medium is inserted horizontally or longitudinally.

11. The multifunction magnetic reading device according to claim 10, wherein
the multifunction magnetic reading device further comprises: a communication interface configured to receive a medium type instruction from an external control device;
the controller is further configured to determine, according to the medium type instruction received by the communication interface, the type of the medium.

12. The multifunction magnetic reading device according to claim 1, further comprising:
a first sensor group, comprising at least two sensors configured to determine whether there is a horizontally-inserted medium.

13. The multifunction magnetic reading device according to claim 1, wherein
the multifunction magnetic reading device further comprises: a medium conveying mechanism; the medium conveying mechanism includes a medium conveying motor and a conveying roller component; the medium conveying motor is configured to drive the conveying roller component to rotate, wherein the conveying roller component is configured to convey the medium longitudinally along the medium path;
wherein the driving mechanism comprises a carriage driving motor configured to drive the magnetic head component to reciprocate horizontally along the medium path in the medium path.

14. A printer comprising the multifunction magnetic reading device according to claim 1.

15. A control method of a multifunction magnetic reading device, the method comprising:
when a medium is medium with a magnetic stripe and the medium is horizontally inserted, driving a magnetic head component to move horizontally along a medium path and controlling a first magnetic head in the magnetic head component to read magnetic coded data recorded in the magnetic stripe; and
when a medium is medium with a MICR character and the medium is horizontally inserted, driving the magnetic head component to move horizontally along the medium path, and controlling an electromagnet in the magnetic head component to be powered on to magnetize the MICR character on the medium, then controlling the first magnetic head in the magnetic head component to read the MICR character on the medium,
wherein the first magnetic head includes a first sub-head and a second sub-head, the first sub-head being configured to read the magnetic coded data recorded in the medium magnetic stripe and the second sub-head being configured to read the MICR character on the medium.

16. The control method claim 15, further comprising:
determining whether the medium is inserted horizontally or longitudinally and, when the medium is medium with a MICR character and is longitudinally inserted, reading the MICR character by the following methods:
Method 1:
during a process of controlling the medium to move along a first direction, controlling the electromagnet in the magnetic head component to be powered on to magnetize the MICR character on the medium, and
after magnetizing the MICR character, controlling the medium to move along a second direction and controlling the second sub-head to read the MICR character on the medium; or
Method 2:
during a process of controlling the medium to move along a first direction, controlling the electromagnet in the magnetic head component to be powered on to magnetize the MICR character on the medium, and
after magnetizing the MICR character, continuing to control the medium to move along the first direction, and controlling the second magnetic head to read the MICR character on the medium, wherein, in the insertion direction of the medium, the second magnetic head is located downstream of the electromagnet, the first direction is the insertion direction of the medium, and the second direction is a direction opposite to the first direction.

17. The method of claim 15, wherein, when a medium is medium with a magnetic stripe and the medium is longitudinally inserted, the method further comprises:
controlling the first sub-head to read magnetic coded data recorded in the medium magnetic stripe during convey of the medium, wherein the longitudinal insertion direction is an extension direction of the magnetic stripe of the medium parallel to the medium conveying direction.

* * * * *